3,277,861
METHOD AND APPARATUS FOR REPELLING RODENTS AND OTHER UNDESIRABLE ANIMALS
Lowell A. Moe, St. Paul, Minn., assignor to Peavey Company, Minneapolis, Minn., a corporation of Minnesota
Filed Oct. 26, 1964, Ser. No. 406,480
7 Claims. (Cl. 116—137)

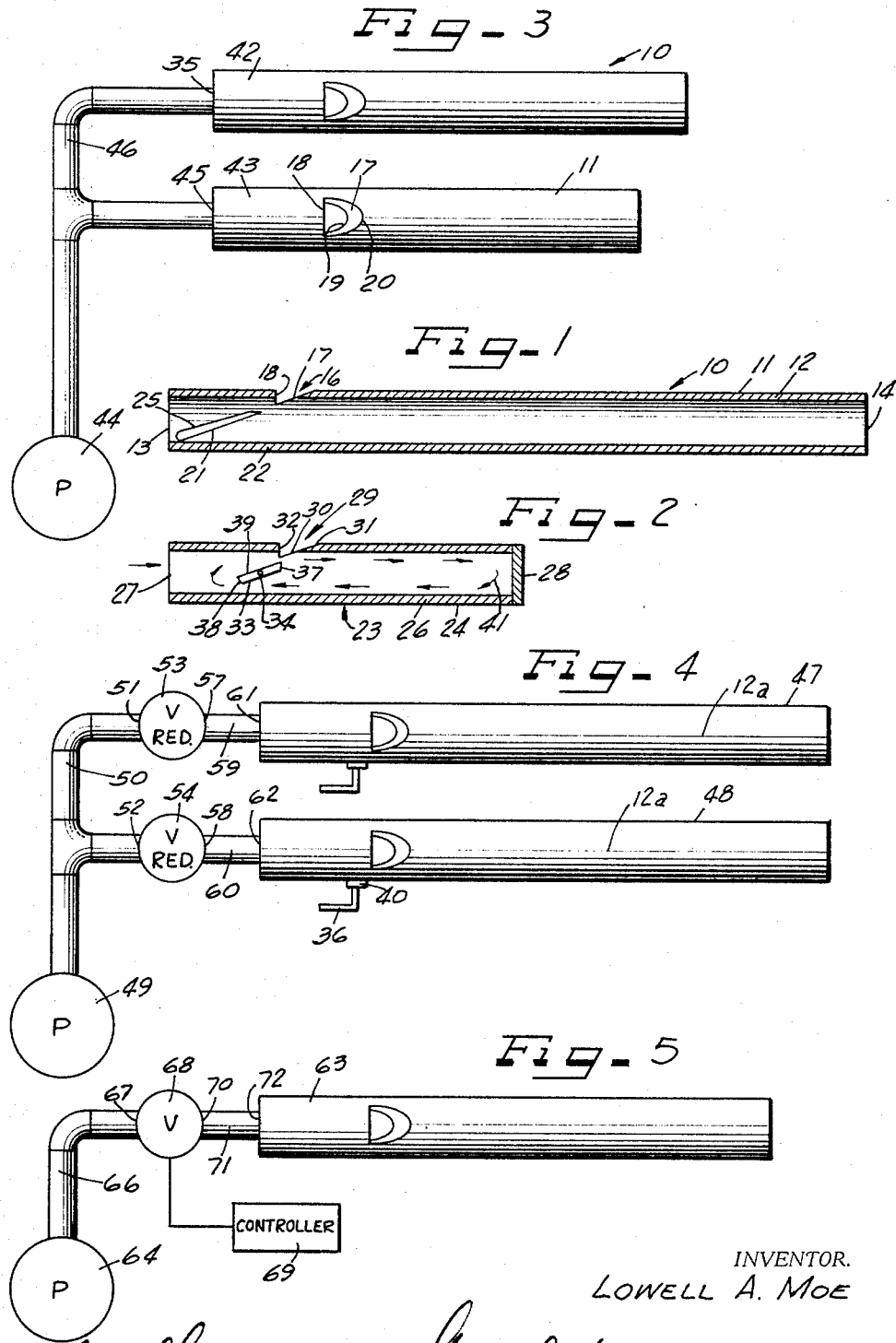

This invention, which is a continuation-in-part of my co-pending application Serial No. 231,965 entitled "Ultrasonic Systems," now Patent No. 3,157,153, relates generally to ultrasonic systems and more particularly to methods and apparatus for generating and utilizing ultrasonic sound waves of the non-sinusoidal type for controlling the location, movement and habitation patterns of animals such as rodents, birds, insects, and the like.

Some animals such as rats and mice, for example, create many problems in certain areas. Aside from the disconcerting and potentially harmful effects the presence of such animals has in populated areas, they can be extremely undesirable in many respects.

Rats and birds, for example, are responsible for heavy damage to foodstuffs, and in large food storage facilities various repellant systems have been employed in an effort to control and reduce the presence and harmful effects of these animals.

One known system for repelling such animals involves the utilization of sound waves having frequencies above the audible hearing range of humans, and recognizes that the limits of hearing of many animals are markedly different from those of humans, and even from one animal species to another.

For example, humans normally perceive as sound those frequencies between about 20 cycles per second and 17 kilohertz, although some individuals can perceive frequencies somewhat higher than 17 kilohertz. The frequency range of greatest sensitivity to humans is considered to be about 1–4 kilohertz. (National Bureau of Standards defines 1 hertz as being equal to 1 cycle per second.)

Rats and mice on the other hand, are capable of perceiving as sound frequencies which are considerably above the upper limit for humans, with the range of greatest sensitivity probably being between about 22–30 kilohertz. Smaller animals, such as centipedes and mosquitoes, apparently are capable of hearing sound having a much higher frequency.

There appears to be some relation between the size of the cranium or the brain cavity and, proportionately, the size of the sound sensing organ of the animal and the audio hearing spectrum of that animal. It would appear from my observations that in general the smaller the cranium and sound sensing organ of an animal, the higher the frequency the animal is capable of hearing.

Sound has a psychological effect on animals as well as humans. Some sounds are conductive to psychological well being. Other sounds have a deleterious effect, and excessive sounds and sounds of high frequency often serve as sources of stress. In addition, such excessive or high frequency sounds can work a direct injury to the ear or other sound sensing organ and can also produce long-term stress effects on the entire auditory mechanism as well as the whole neurophysiological system.

It has been determined, for example, that rats may be put under severe conditions of stress when subjected to ultrasonic sound waves beyond about 20 kilohertz, and will make an effort to escape such waves. Pigeons are likewise effected by sound waves within about a 16–18 kilohertz frequency range. The aforementinoed known systems for repelling animals through the use of ultrasonic sound have taken cognizance of this effect and have employed ultrasonic sound generators to fill a given area or space with a high frequency sound wave, often having a temporary effect of causing the animals to withdraw from such given space.

In prior art systems, however, the salutary effect of repelling the animals from any given space is generally not long-lived. After a period of time the animals will usually again re-enter the area. However, if the frequency of the ultrasonic sound wave which envelops the space is changed slightly, the animals will generally be again repelled for a relatively short period of time, and then reappear.

From such observations it has been concluded that continued exposure of the animals to a given sound frequency over an extended period of time, as in the case of humans, probably tends to make the animals relatively immune to sound having that given frequency. This phenomenon has been referred to variously as "deafness immunity" or "slotted deafness," and as a consequence of such immunity, a high frequency sound wave, initially effective in causing conditions of stress in the animals, will gradually begin to lose its effectiveness. A change in frequency of the sound wave will, however, usually tend to re-activate the stress conditions in the animals.

In order to overcome the undesirable effects of "deafness immunity" the suggestion has been made to constantly vary the frequency of the sound wave, possibly within a given range. In electric or electronic oscillator-transducer sound generating equipment utilized in prior systems, a variable frequency can be obtained, but such variations are generally regular with respect to time. It has also been suggested that a pair of ultrasonic sound waves of differing frequencies be generated simultaneously, thereby providing, in addition to the fundamental frequencies, "beat" frequencies or frequencies equal to both the total and the difference of the fundamental frequencies, thus somewhat reducing the ability of the animals to develop so-called "deafness immunity" to the sound waves.

None of these prior systems, however, has been particularly satisfactory in operation, and after a period of time the rodents generally reappear. In addition, the generation of ultrasonic waves electrically or electronically has presented other problems, some of which involve regulations of the Federal Communications Commission with respect to electrical generation of ultrasonic sound at frequencies above 20,000 cycles per second, and others of which have to do with Underwriters' Laboratory requirements for electrical apparatus. For example, the extremely explosive nature of the gases which are present in many food storage facilities, such as grain elevators, requires precautionary measures with respect to fire or sparks. Even locating an electric oscillator a sufficiently safe distance from an elevator does not solve the problem since the electric transducers themselves should be housed in explosion-proof enclosures if situated within a hazardous area. Such enclosures, of course, can seriously reduce or even eliminate the effectiveness of the transducers.

In addition, such electrical sound generating apparatus is quite inefficient and requires a conversion from electrical energy to sound pressure, thereby resulting in a loss of energy. Furthermore, high intensity sound is generally much more effective than sound at low intensity, and in most instances commercially available electric sound generating equipment is generally incapable of producing sound of sufficient intensity to be most effective. Conventional loudspeakers generally become very inefficient at frequencies above about 10 kilohertz. On the other hand, the piezoelectric and magnetostrictive transducer conventionally used in industrial ultrasonic applications are most efficient only over the narrow frequency width for which they are designed. In addition such electronic equipment is expensive and the cost of installation of prior art systems may well be prohibitive in most instances.

The present invention resides in part in the discovery of what is apparently the major reason for the generally unsatisfactory results of the prior systems in repelling small-cranium animals such as birds and rats continuously and permanently. In addition, the invention comprises the discovery of how the problem can be overcome, while utilizing apparatus which is inexpensive, efficient and which does not present a hazard in explosive gas-laden areas.

Repellant systems constructed in accordance with the principles of the present invention have demonstrated the permanent nature of the effectiveness of the invention with respect to rats and mice, and it is reasonable to presume that tests presently being conducted will indicate that the invention is equally satisfactory with respect to other small-cranium animals.

It is, therefore, an object of the present invention to provide a method and apparatus for controlling the location, movement and habitation patterns of small-cranium animals, such as rats and mice, continuously and permanently.

It is also an object of the invention to provide a method and apparatus for generating ultrasonic sound waves having characteristics which produce an intolerable stress condition in the animals to cause their immediate re-location or movement and withdrawal from a given space filled with or enveloped by such sound waves.

Another object is to prevent the animals from developing so-called "deafness immunity" to the ultrasonic sound waves.

A further object of the invention is to provide apparatus for generating ultrasonic sound waves which can be situated in explosive gas-laden areas without the necessity of housing such apparatus within explosion-proof enclosures.

Yet another object is to provide apparatus for the purposes described which is economical in manufacture and installation, dependable and efficient in operation, requires no moving parts and which can serve a long, useful life.

Many other features, advantages and additional objects of the present invention will become manifest to those versed in the art upon making reference to the detailed description which follows and the accompanying sheets of drawings, in which preferred structural embodiments incorporating the principles of the the present invention are shown by way of illustrative example only.

In the drawings:

FIGURE 1 is an elevational sectional view of a tubular resonator adapted to generate ultrasonic sound waves and useful in the practice of the present invention;

FIGURE 2 is an elevational sectional view of another embodiment of a tubular resonator;

FIGURE 3 is a top plan view of a pair of resonators of unequal length connected to a source of pressurized fluid;

FIGURE 4 is similar to FIGURE 3 but shows resonators of equal length connected to a source of pressurized fluid through pressure reducing valves; and FIGURE 5 is a top plan view of a resonator connected to a source of pressurized fluid through a valve-controlled pressure reducing valve.

As shown on the drawings:

As noted, prior art systems which have utilized electric or electronic sound generating equipment have, in some instances, been effective in causing the temporary withdrawal of small-cranium animals such as birds and rats from the space or area being "conditioned" or subjected to ultrasonic sound waves generated by such equipment. However, the distance from the sound generators from which the animals tend to withdraw is not generally great, and in a relatively short period of time the animals apparently develop so-called "deafness immunity" or "slotted deafness" and will usually reappear in such space. It is known that the simultaneous generation of two sound waves of different frequencies will produce beat frequencies and thereby reduce such "deafness immunity" to a degree, and the frequency of the sound wave from a single source can also be constantly modulated. However such arrangements, as previously noted, while having a somewhat greater repellant effect, are still not too satisfactory, and after a period of time the animals will, in most instances, reappear.

The present invention resides in part in the discovery that not only does sound intensity play an important part in the effectiveness of an ultrasonic sound animal controlling or repeellant system, but even more so are the characteristics of the sound wave important.

Tests have demonstrated that the more regular the characteristics and wave forms of the ultrasonic sound waves, with respect not only to frequency but also to amplitude, the less extreme is the condition of stress put upon the animals to cause the initial evacuation of the "conditioned" space and the more pronounced is the ability of the animals to develop "deafness immunity" after a relatively short period of time.

It was discovered that when the animals are subjected to what might be referred to as "random noises," within a generally predetermined and somewhat relatively limited range of frequency and amplitude, the increased harmful effects on the animals are extremely noticeable.

It was further determined that ultrasonic sound waves of the non-sinusoidal type which comprise a fundamental frequency and a plurality of harmonics which are multiples of the fundamental frequency, produce particularly discomforting sounds and random noises which apparently are much more intolerable to the animals especially when there are at least three major harmonics, a major harmonic being defined as a frequency having a sound level or intensity within 40 decibels of the sound level of the fundamental. Further, when two or more of such nonsinusoidal waves are combined, particularly when the fundamental frequencies of the two or more waves are within from about ½ to 10 kilohertz, the resultant effect on the animals appears to be excruciating, particularly when the waves to which the animals are directly subjected are within a certain decibel rating.

An analysis was conducted of the differing wave forms produced by various apparatus and the effect of such waves on the aural mechanisms of the animals and such analysis disclosed certain theoretical considerations which, it is believed, account for the greatly increased effectiveness of one type of wave form over another.

First of all, most sound generators capable of producing ultrasonic sound waves, that is waves having frequencies beyond the human audible spectrum (or beyond about 15–17 kilohertz) inherently produce sound waves which are essentially sinusoidal. For example, electric oscillator-transducer arrangements are normally productive of sound waves which have the appearance of pure sine waves when projected on an oscilloscope. A sinusoidal wave, for example, if it is within a given range of frequencies, may have an irritating effect on rats, but the effect of this wave form is relatively shortly overcome by the development of "deafness immunity" of the animals to the particular frequency of the sound wave.

The simultaneous generation of two sinusoidal waves which are mixed together produces a more serious effect on the animals due to the additional "beat" frequencies generated, such additional frequencies being equal to (1) the sum of and (2) the difference between the fundamental freqeuncies. For example, a 20 kilohertz frequency, if mixed with a 30 kilohertz frequency, will effectively produce in the aural system of the animals additional 50 (20+30) and 10 (30−20) kilohertz frequencies.

Modulation of the frequency of a sinusoidal wave as well as modulation of the amplitude thereof appears to increase the irritating effects of the sound and reduce the capability of developing a tolerance or deafness immunity, but neither of these methods have resulted in a repelling effect on the animals over an extended period of time.

One the other hand, the utilization of a nonsinusoidal ultrasonic sound wave which comprises a fundamental frequency and a plurality of harmonics which are multiples of the fundamental frequency, has produced greatly improved results. The mixing of two or more different non-sinusoidal waves, wherein the frequencies of the respective fundamentals are successively higher one from the other but each has a frequency within the range of about ½ to 10 kilohertz of the frequency of the next lower and higher fundamentals, has produced, for practical purposes, a complete effect.

For example, in one field test, apparatus constructed in accordance with the principles of the present invention was installed in a large grain elevator having a capacity of approximately 3,000,000 bushels. During the three month period next preceding the installation of the apparatus of the present invention, the rat "catch," as will be understood by those versed in the art to mean the number of rats trapped within the elevator, was 136.

The apparatus of the present invention was then installed within the elevator for several days, after which it became apparent through "track" observations, as will be understood by the artisans, that there were then no living rats within the elevator. Next, a total of seven individual sources of non-sinusoidal ultrasonic sound waves, produced by generators of the type included in the present invention, were placed respectively about the outer wall of the elevator at each of seven points of entry into the elevator. The previously utilized trapping arrangement within the elevator was maintained in operation but in the next seven months, during which the apparatus of the present invention was continuously operated, only two rats were trapped within the elevator. It is believed that the two rats that were able to enter and were trapped within the elevator must have probably suffered from a defect in their aural mechanisms.

Referring again to previously known systems, another problem or disadvantage in the utilization of electric transducers, such as electrodynamic speakers, magnetostrictive transducers, piezoelectric transducers having, for example, barium titanate crystal, and others, is that such apparatus, at least commercially available models thereof, are limited in power output. In addition, a given number of separate instruments or frequency sources are required to produce the same number of frequencies. For example, in an oscillator-magnetostrictive transducer arrangement, a separate oscillator is required for each continuously generated frequency, and in addition it is difficult to achieve a high degree of power or sound intensity with such apparatus, particularly at extremely high frequencies.

It was determined that sound generators of the pressurized-fluid operated resonator type, such as the tubular or cavity type, the resonant-wedge type, the vortex type, and others, if adapted to produce ultrasonic sound waves and if supplied with a sufficient quantity of fluid at a sufficiently high pressure so as to avoid "air collapse" or "starvation" of the generator, can produce a non-sinusoidal sound wave comprising a sufficient number of harmonic frequencies along with a fundamental frequency to probably span the entire audible hearing spectrum of many or most small-cranium animals such as rates. For example, if a fundamental frequency of 25 kilohertz is produced by such apparatus, harmonics having frequencies of 50, 75, 100, 125, 150 and 175 kilohertz (through the 6th harmonic) may also be easily produced. Some resonators can produce ultrasonic sound waves with a relatively low air pressure, and with some resonators four or more major harmonics can be produced while utilizing an air pressure of only 0.5 p.s.i.g., while other resonators may require from 3 p.s.i.g. up to 15 p.s.i.g. or more to produce this number of harmonics. Many resonators constructed in accordance with the principles of the invention and which I tested were capable of producing a fundamental frequency of much greater than 20 kilohertz and up to six major harmonics with less than 15 p.s.i.g. air pressure, although in producing sound intensities above about 90–100 decibels a greater air pressure was usually required.

Referring again to the drawings, FIGURES 1–5 illustrate several arrangements of certain embodiments of one such non-sinusoidal generator which has been utilized in the production of ultrasonic sound waves comprising a fundamental frequency and at least six harmonics, although other generators have also been successfully tested and utilized. The generator shown in FIGURES 1–5 is of the pressurized-fluid operated tubular resonator type, as shown generally at 10, and is characterized by a hollow tubular body 11 having a side wall 12 which is open at both ends as shown at 13 and 14. An aperture generally shown at 16 is formed in the top portion of the side wall and is partially defined by an oblique wall 17 and a vertical wall 18.

The aperture 16 is formed by the removal of a portion of the side wall 12 at the top of the body 11. The removed portion, viewed from the side as in FIGURE 1, takes the form of a triangle. As viewed from the top, however, as in FIGURE 3, the portion takes the form of a half-ovoid body. A cleavage point or lip is formed by the oblique wall 17 and also takes a half-ovoid form.

Sound waves are generated with an open-cavity tubular resonator by introducing air or other fluid into the resonator at the open end or inlet port 13. As the air travels through the resonator in the direction of the open end or outlet port 14, part of the fluid at the upper portion of the fluid stream comes into contact with the cleavage point 19 where it is split or separated. Some of the cleaved fluid passes out of the resonator through the aperture 16 and the remainder continues moving through the resonator to the outlet port 14. At the front edge 19, the fluid is in a constant process of building up and dropping in pressure. This rapidly modulating pressure variance at the cleavage point produces oscillation of the fluid in the resonator and results thereby in a sound wave.

In producing sound waves in the audible frequency spectrum, that is, below about 15–17 kilohertz, the length of the cavity which is that distance between the vertical wall 18 and the outlet port 14, is equal to ½ of the wave length produced. The pressure of the fluid required to produce frequencies in this range is sufficiently low so that it does not affect the frequency. However, in producing ultrasonic frequencies a higher fluid pressure is required, and this higher pressure does have an effect on the frequency, increasing the frequency somewhat as the pressure is increased. It is believed that pressure has an effect on frequency due to its effect on the density of the fluid which in turn affects the velocity of sonic wave travel in the medium. Also the velocity of the flow of the fluid through the resonator may have a substantial effect upon the frequency.

At the higher fluid pressures required for higher frequencies, the pressure build-up at the cleavage point increases to effectively collapse oscillation of the fluid in the resonator, thereby precluding generation of ultrasonic frequencies in a conventional tubular resonator. In order to overcome this collapse in the illustrated resonator, a baffle 21 having a flat surface 25 is affixed to a bottom portion 22 of the side wall 12 within the body 11 between the inlet port 13 and the aperture 16. This baffle does not extend to an upper portion 12$_a$ of the side wall 12 and effectively directs the high pressure fluid entering through the inlet port 13 in the direction of the cleavage point or front edge 19. The baffle 21 effectively overcomes the problem of pressure build-up and collapse at the cleavage point. Oscillation of the fluid is thereby sustained and a constant ultrasonic sound wave is produced.

In addition, if a sufficient quantity of pressurized fluid is supplied to the inlet 13 at sufficient pressure, a plurality of harmonics which are multiples of the fundamental frequency generated by the resonator will also be produced. For the purpose of repelling rodents, it would appear that harmonics beyond the 6th harmonic of an ultrasonic sound wave having a fundamental frequency of about 25 kilohertz need not be considered, as this may well be beyond the hearing capabilities of such animals.

A closed cavity resonator is shown generally at 23 in FIGURE 2 and comprises a tubular body portion 24 having a side wall 26 with an open end or inlet port 27 and a closed end 28. An aperture shown generally at 29 is formed in the top portion of the side wall and is similar to the aperture 16 of the open-cavity resonator shown in FIGURE 1. A cleavage point 30 is formed by an oblique wall 31 and it takes a half-ovoid form similar to the aperture 16 of the open cavity resonator.

Sound waves are generated in a closed-cavity resonator by introducing air or other fluid into the resonator at the open end 27. As the air travels through the resonator in the direction of the closed end 28, part of the fluid at the upper portion of the fluid stream comes into contact with the cleavage point 30, where it is split or separated. Some of the cleaved fluid passes out of the resonator through the aperture 29 and the remainder continues moving through the resonator in a vibrating or oscillating manner to the closed end 28 where the oscillations rebound in the direction of the aperture 29 and mix with the fluid passing out of the aperture, thereby producing a sound wave.

In producing sound waves by means of a closed-cavity resonator in the human audible frequency spectrum, that is, depending on the individual person, below about 15 kilohertz, the length of the cavity, which is that distance between the vertical wall 32 and the closed end 28, is equal to one-quarter of the wave length produced. In the low frequency range the fluid pressure required to produce the sound wave is not sufficiently high to affect the frequency. In producing ultrasonic frequencies, however, a higher pressure fluid is required. The frequency of the sound wave increases somewhat as the fluid pressure is increased, and also increases upon a reduction of the length of the cavity.

In conventional closed-cavity resonators, a high fluid pressure and a short cavity will produce a pressure build-up at the cleavage point 30 causing the collapse of oscillations. In order to overcome this collapse, an adjustable baffle 33 is carried within a side wall 26 and pivotally mounted on a shaft 34 which is journalled at both ends to the side wall 26. As illustrated in FIGURE 4, the shaft 34 may extend to the exterior of the resonator to form an adjustable arm 36. The baffle has a front and rear edge 37 and 38 and a flat surface 39. A journal 40 of the shaft 34 is suitably adapted to prevent the edges 37 and 38 from coming into contact with the side wall 26. In producing ultrasonic sound waves by means of a closed cavity resonator as modified by the baffle 33, a high pressure fluid is supplied to the inlet port 27 where it is directed by the flat surface 39 of the baffle 33 into contact with the cleavage point 30. That portion of the fluid stream which remains in the resonator and moves to the closed end 28 is represented by arrows 41. The fluid rebounds from the wall 28 and moves along the bottom portion of side wall 26 in the direction of the inlet port 27 until it passes between the rear edge 38 of the baffle 33 and the side wall 26. It is there drawn into the fluid stream entering at the inlet port 27 and is admixed with the incoming fluid to be directed once again by the flat surface 39 to the cleavage point 30 thereby precluding collapse of the oscillations at the cleavage point 30. Similarly with respect to the open cavity resonator 10, if a sufficient quantity of pressurized fluid is supplied to the inlet 27 at sufficient pressure, a plurality of harmonics which are multiples of the fundamental frequency generated by the resonator will also be produced.

As mentioned, tests have indicated that the most important consideration in providing a continuous and permanent controlling or repellant effect is the "random noise" imposed on the aural mechanism of the animals by non-sinusoidal ultrasonic wave forms. Some additional or secondary effect may be provided by the simple modulating overtones which result from the mixing of two sinusoidal waves of differing frequencies. For example, a pair of tubular resonators having slightly different lengths are shown at 42 and 43 in the drawings. A fluid pump 44 capable of supplying a fluid under pressure is connected by means of a pipe 46 to the inlet ports 35 and 45 of the resonators. The sound waves generated by the resonators (considering only the fundamental frequencies), being at slightly different frequencies, will produce modulating overtones or beat frequencies within the nervous systems of the animals.

In another arrangement as shown in FIGURE 4, a pair of resonators 47 and 48 of equal lengths are connected to a fluid pump 49 by means of conduits 50 and pressure reducing valves 53 and 54. The fluid enters the valves through their respective inlet ports 51 and 52 and leaves through their respective outlet ports 57 and 58 which are connected by means of conduits 59 and 60 to inlet ports 61 and 62 of the resonators 47 and 48.

Another arrangement in FIGURE 5 comprises a single resonator 63. A fluid pump 64 is connected through conduit 66 to an inlet port 67 of an adjustable pressure reducing valve 68. The setting of the valve can be varied by means of a controller 69 to vary the fluid pressure at outlet port 70 of the valve 68. The outlet port is connected by means of conduit 71 to inlet port 72 of the resonator 63. By varying the pressure of the actuating fluid as it enters the inlet port 72 of the resonator, the frequency of the ultarsonic sound wave produced thereby will vary accordingly. Periodic changing of the setting of the valve 68 by means of the controller 69 will correspondingly vary the frequency of the ultrasonic sound wave being produced and will have a supplemental effect upon the conditions of stress imposed upon the animals.

Generally, effective employment of the resonators illustrated in the drawings requires only that the resonators be located in or near the sound "conditioned" space, since such resonators inherently radiate or direct sound waves generated thereby away from the resonator. Of course, various sound directing means such as a bell-shaped housing can be utilized at the outlet of the resonator to obtain better direction of the waves. Where more than one resonator is used, the resonators may be positioned in mutually spaced relation, and various housings may be employed to direct the sound waves from each resonator to a given area or space.

The difference in effectiveness between prior art systems and a system incorporating the principles of the present invention can probably be best explained through an analysis of the wave forms of the systems and their effects upon the aural mechanisms of the animals.

As noted, a sinusoidal ultarsonic sound wave has a relatively limited deleterious effect on the neurophysiological well being of the animals, and tests have indicated the repellant effect of such waves, for example, is not enduring. Modulation of the frequency and/or amplitude of such waves or the pulsing thereof, also increases the effectiveness of the sound only to a relatively minor degree. Combining two or even several such sinusoidal waves also produces only a minor increased effect.

As an example, the combining of two sinusoidal waves, each of which has a different frequency, produces a total of four frequencies, the two fundamental frequencies and two beat frequencies, one of which is the sum of the frequencies of the fundamentals and the other of which is the difference between the frequencies of the fundamentals.

The aural mechanism of most animals, and small-cranium animals such as rats, birds, and the like is similar to the aural mechanism of humans in that there exists a non-linear relationship between the sound waves acting on the second responsive or sensing organ, such as an eardrum and the movement of the sound sensing organ itself as well as the sensation of sound which exists in the brain. Such non-linear relationship can be expressed by the following equation:

$$I = ae + a_1 e^2 + a_2 e^3 \ldots a_n e^{n+1}$$

where
$I$ = Sound pressure or intensity as experienced by the sound responsive or sound sensing organ of the animal and transmitted to the brain of the animal.
$e$ = Sound pressure or intensity applied to the sound sensing organ by a sound wave acting thereon.
$a$ = Numerical coefficients or proportionality constants which vary from animal to animal, and which include wave amplitude coefficients.

Since resultant frequencies beyond the cubic form ($a_2 e^3$) appear to have no practical effect upon the aural mechanisms of the animals, perhaps due to reduced amplitude, such frequencies will not be considered in the calculations shown hereinafter.

Referring again to a sinusoidal wave and its effect upon the animal's aural mechanism as indicated by the above equation, if a single sinusoidal wave is imposed upon the sound sensing organ, the number of frequencies experienced by such organ and transmitted to the brain can be determined as follows:

With one sinusoidal wave, which may be defined as sin $wt$ where "$w$" equals $2\pi \times$ frequency and "$t$" equals time:

$$I = ae + a_1 e^2 + a_2 e^3$$
$$= a(\sin wt) + a_1(\sin wt)^2 + a_2(\sin wt)^3$$

By expanding this equation, it will be noted that a total of 14 frequencies effect the animal's brain through the sound sensing organs such as the eardrum, namely, $w$, $2w$, $o$, $w$, $w$, $2w$, $o$, $w$, $w$, $3w$, $w$, $w$, $w$, $-w$.

Although the total number of frequencies produced is 14, a cancellation of those frequencies which are duplicates of one another results in a net total of four frequencies ($o$, $w$, $2w$, $3w$), which are imposed, effectively, upon the brain of the animals.

In the discussion which follows the *total number* rather than the net total number of frequencies is used as a basis of comparison of the known sinusoidal systems with the non-sinusoidal system of the present invention, since the number of mathematical computations necessary to determine duplications of frequencies to arrive at net totals is prohibitive.

Next, consider the total number of frequencies which results from the imposition of two sine waves on the animals sound sensing organ. By substitution in the non-linear equation, referred to hereinafter merely for convenience as the "ear" equation:

$$I = ae + a_1 e^2 + a_2 e^3$$

we arrive at:

$$I = a(\sin w_1 t)(\sin w_2 t) + a_1[(\sin w_1 t)(\sin w_2 t)]^2 + a_3[(\sin w_1 t)(\sin w_2 t)]^3$$

where
$w_1$ = frequency of first wave (actually, $2\pi f$.).
$w_2$ = frequency of second wave (actually, $2\pi f_2$).

The total number of frequencies (including duplications) which effectively act upon the animal's brain through the combining of two sine waves, as determined by the above equation, is 41.

In general, the total number of frequencies (including duplications) which effectively act upon the brain as a result of the non-linear response of the animals' sensing organ or eardrum can be obtained from the following equation:

$$I = \sum_{W_1}^{W_x} \sum_{N=1}^{N} \sum_{K=1}^{K} (\sin Nwt)^K$$

where
$x$ = Number of sources of sound waves having different fundamental frequencies.
$N$ = Number of harmonics (if any) included in each of the sound waves which are multiples of the fundamental frequency of each of the sound waves.
$K$ = Equation exponent which, from a practical standpoint as noted hereinabove, should be limited to 3.

By contrast, next consider the number of frequencies which effectively act upon the animal's brain through the utilization of non-sinusoidal sound waves. In some of my tests, the pressurized-fluid operated resonators used produced a fundamental frequency and four major harmonics plus a number of minor harmonics which will not be considered in this analysis.

In order to determine the effective number of frequencies (including duplications) which result through the use of one resonator producing one fundamental frequency and five (not four) major harmonics, we again refer to the equation $I = ae + a_1 e^2 + a_2 e^3$ and make the necessary substitutions, which results in the following expression:

$$I = a(\sin wt + \sin 2wt + \sin 3wt + \sin 4wt + \sin 5wt)$$
$$+ a_1 (\sin wt + \sin 2wt + \sin 3wt + \sin 4wt + \sin 5wt)^2$$
$$+ a_2 (\sin wt + \sin 2wt + \sin 3wt + \sin 4wt + \sin 5wt)^3$$

In order to determine the number of effective frequencies which result from a non-sinusoidal wave having a fundamental frequency and five harmonics, by means of the above equation, the general expression $$I = \sum_{W_1}^{W_x} \sum_{N=1}^{N} \sum_{K=1}^{K} (\sin Nwt)^K$$

is applicable.

Although the exact number of frequencies available has not been calculated, I have determined an empirical relationship or mathematical trend which I believe is helpful in determining the approximate number of effective frequencies which results from the utilization of one or more sources of sound, each of which generates a fundamental frequency and five harmonics. The empirical equation is as follows:

$$F_t = 6^N + 4(77)^N$$

where
$F_t$ = Total number of effective frequencies (including duplications).
$N$ = Number of individual sources of sound waves each of which comprises a fundamental frequency plus 5 harmonics for a total of 6 frequencies.

While I have conducted tests utilizing various resonators or horns which generate different numbers of harmonics, the following table is illustrative of the mathematical trend that has been compiled to show an approximation of the theoretical number of effective frequencies through the utilization of one through six sources of non-sinusoidal ultrasonic sound waves, each of which generates a fundamental frequency and five harmonics:

1 source (1 fundamental, 5 harmonics) = $6^1 + 4(77)^1$
 = 314 frequencies.
2 sources (1 fundamental, 5 harmonics) = $6^2 + 4(77)^2$
 = 23,752 frequencies.
3 sources (1 fundamental, 5 harmonics) = $6^3 + 4(77)^3$
 = 1,826,348 frequencies.

4 sources (1 fundamental, 5 harmonics)=$6^4+4(77)^4$
=35,154,337 frequencies.

5 sources (1 fundamental, 5 harmonics)=$6^5+4(77)^5$
=2,706,791,933 frequencies.

6 sources (1 fundamental, 5 harmonics)=$6^6+4(77)^6$
=208,422,426,745 frequencies.

As mentioned, the above table represents a mathematical relationship based on observed trends and which I believe represents an approximate mathematical difference between the frequencies effectively available from the sources mentioned in the table. The table does not take into account the reduced number of frequencies that would appear if all of the "zero" frequencies, duplications of frequencies and those frequencies beyond the area of interest (audible hearing spectrum of the animals) were omitted.

In order to provide another comparison, assume that an electric oscillator-transducer (sinusoidal) system is arranged which includes two oscillators, each of which operates at a different frequency, and which also includes three transducers connected to each of the two oscillators (which would in effect constitute only two sources, each of which produces an essentially sinusoidal wave) as contrasted with a pressurized-fluid operated resonator system which includes six resonators, each of which is adapted to provide a fundamental frequency (which differs from the fundamental of the other resonators) and five major harmonics.

The general equation (taken only to the cubic form) for determining the total number of effective frequencies (including duplications, zero frequencies and even those frequencies that may be beyond our area of interest) is, as we have seen, as follows:

$$I=ae+a_1e^2+a_2e^3=\sum_{W_1}^{W_x}\sum_{N=1}^{N}\sum_{K=1}^{K}a(\sin Nwt)^K$$

where $x$=Number of effective sources.
$N$=Number of total frequencies (fundamental and major harmonics) per source.

Substituting the proper terms for the electric oscillator-transducer system including two oscillators and six transducers, we arrive at the following expression:

$$I=\sum_{W_1}^{W_2}\sum_{N=1}^{1}\sum_{K=1}^{3}a(\sin Nwt)^K$$
$$=\sum_{W_1}^{W_2}\sum_{K=1}^{3}a(\sin wt)^K$$

Expanding this equation, the total number of effective frequencies is 41.

Substituting the proper terms for the pressurized fluid-operated resonator system including six resonators, each of which comprises a fundamental frequency (different from the others) and five harmonics, we arrive at the following expression:

$$I=\sum_{W_1}^{W_6}\sum_{N=1}^{6}\sum_{K=1}^{3}a(\sin Nwt)^K$$

Expanding this equation, the total number of effective frequencies equals 208,422,426,745, according to the approximation arrived at hereinabove in connection with the empirical expression $F_t=6^N+4(77)^N$ Again it is to be noted that this extremely large number includes duplications of frequencies, zero frequencies as well as frequencies beyond the range under consideration, but nevertheless is helpful, in my opinion, to illustrate an approximate mathematical comparison of known systems utilizing sources of sound which generate sinusoidal waves as contrasted to the present invention, the principles of which reside in part in the utilization of sources which generate, individually, non-sinusoidal waves which constitute a fundamental frequency and 3, 4, 5, 6 or more major harmonic frequencies which are a multiple of the fundamental frequency. As a result of my tests, it would appear impractical to assemble in any given area or space a sufficient number of sound sources such as electric transducers (which generate essentially a sinusoidal wave) to provide a sufficient number of effective frequencies in the aural mechanisms of the animals to make the repellant effect of the sound produced thereby of a constant and permanent nature. My tests further indicate that simple modulation of frequency and/or amplitudes or pulsation of sinusoidal ultrasonic sound waves is not satisfactory to produce a permanent repellant effect. It would appear that the greatly increased number of frequencies which can be produced by the non-sinusoidal type of wave form generated by a pressurized fluid-operated resonator, adapted to produce ultrasonic sound and supplied with a sufficient quantity of sufficiently pressurized fluid to avoid "starvation" of the resonator, and the compounding effects of such wave forms on the brains of the animals, does result in a continuous and permanent controlling or repellant effect.

In addition, such pressurized fluid-operated resonators or horns can be safely used in explosive gas-laden areas without the necessity of providing an enclosure and without the concomitant reduction or elimination in effectiveness attendant thereto.

It has also been determined that the effectiveness of sound repellant systems depends to some degree on the sound pressure or intensity of the sound waves to which the animals are subjected, but below the "threshold of pain" intensity.

As is well known, if almost any animal, including humans, is subjected to sound which has an intensity or sound pressure level above a certain decibel rating, the so-called "threshold of pain" for the particular animal is exceeded, as a result of which the animal experiences pain due primarily to the "loudness" of the sound. For example, sound intensity will exceed the "threshold of pain" for the average human at about 130 decibels $$\text{(where decibel}=10\times\log\frac{P_1}{P_2}$$

and $P_1$=generated sound power and $P_2$=a reference power which is equal to $10^{-16}$ watts/sq. cm.).

The concept of subjecting animals to a sufficiently high level sound intensity whereby the "threshold of pain" (due primarily to sound intensity) is exceeded, is not particularly helpful in consideration of the problems to which the present invention is addressed. First of all, extremely high intensity sound can be fatal to the animals, and in many practical applications it is desired to merely repel the animals from a so-called "conditioned" space, such as a food stortage facility, rather than to kill them within the space, the effect of which could, in itself, result in great damage to foodstuffs.

In addition, if a human is subjected to a sound wave of sufficient intensity whereby the threshold of pain is crossed, the human will experience pain even though the frequency of the sound wave is above the human audible hearing spectrum and cannot, in fact be heard by the human. In this respect, it is important to note that my experiments have shown that if a human is subjected to two (or more) ultrasonic sound waves, both of which are at a frequency beyond the human hearing spectrum and therefore not heard by the person, a "beat" frequency produced by the two sound waves and within the human hearing spectrum, will also not be heard by the person. It would appear that in any circumstance, if the fundamental frequencies cannot be heard, other frequencies produced by the fundamentals also cannot be heard.

Further, it has been determined that the stress effect of non-sinusoidal ultrasonic sound waves on animals such as rats is sufficient to provide excellent results when the decibel rating of the sound waves acting directly on the animals is anywhere from "threshold of pain" intensity for humans down to about 20 decibels, with best results often occurring within the range of from 55 to 90 db.

With respect to ultrasonic sound generators of the pressurized fluid-operated type contemplated in the present invention, it would appear that exceptional results are obtained in terms of generating non-sinusoidal waves having at least three major harmonics of the fundamental frequency where the decibel rating of the sound produced by the generators has a decibel rating of at least 55 db at a distance of one foot from the generator.

Thus, there has been provided a method and apparatus for controlling the location, movement and habitation patterns of small cranium animals such as birds, rats and the like. I am presently conducting experiments on other small-cranium animals and the results thus far obtained indicate that, although the range of fundamental frequencies must, to be most effective, increase with or decrease in the size of the craniums of various animals, the principles of the present invention are equally applicable probably to all or most species of small-cranium animals. The effect is continuous. For example, the animals can be permanently repelled from a given space. The apparatus utilized in air operated and is safe for use in dust laden atmospheres such as grain elevators and other food storage and processing plants. Since it is air operated, there is no requirement for the costly and inefficient conversion of electrical energy to mechanical energy, and complex vacuum tubes, transistors and other electronic equipment is eliminated.

Although minor modifications might be suggested by those versed in the art, it should be understood that I wish to embody within the scope of the patent warranted herein, all such modifications as reasonably come within the scope of my contribution to the art.

I claim as my invention:

1. A method of controlling the movement, location and habitation patterns of small-cranium animals freely movable with a given space comprising the steps of:
    establishing and maintaining at a single source a non-sinusoidal ultrasonic sound wave comprising
        a fundamental frequency of at least 15 kilohertz and at least three major harmonic frequencies and having a sound level at least 55 decibels at such source,
    directing such wave from said source into such given space to the aural mechanisms of such small-cranium animals within such space, and
    positioning said source with respect to such space so as to provide a sound level of said waves in such space of at least 20 decibels.

2. A method of repelling rodents and other small cranium animals from a given space comprising the steps of:
    generating respectively from a plurality of sources a corresponding number of non-sinusoidal ultrasonic sound waves each of which comprises a fundamental frequency of at least 15 kilohertz and a plurality of harmonics each of which is a multiple of its respective fundamental frequency with each of the fundamental frequencies being different from the fundamental frequency of the other non-sinusoidal waves and with the sound level of each of said waves being greater than 55 decibels,
    positioning said sources in spaced relation to one another,
    directing said waves generated by said sources into such space to intersect and to mix with each other, and applying the mixed waves to such animals in such space at a sound level of at least 20 decibels.

3. A method of repelling rodents and other small-cranium animals from a given space comprising the steps of:
    generating from a first single source a first non-sinusoidal ultrasonic sound wave comprising a fundamental frequency greater than 15 kilohertz and at least three major harmonic frequencies,
    generating from a second single source a second non-sinusoidal ultrasonic sound wave comprising a fundamental frequency greater than 15 kilohertz and within 10 kilohertz of of the fundamental frequency of said first sound wave and also comprising at least three major harmonic frequencies,
    directing said sound waves into said space, and applying said sound waves to such animals within such space.

4. The method as defined in claim 3 wherein the fundamental frequency of said non-sinusoidal second sound wave is within one kilohertz of the fundamental frequency of said first sound wave.

5. A method of repelling rodents and other undesirable animals from a given space comprising the steps of:
    generating from a single source a non-sinusoidal ultrasonic sound wave comprising a fundamental frequency within the range of from 17.5 kilohertz to 75 kilohertz and at least three harmonic frequencies which are multiple of the fundamental frequency,
    directing said sound wave into said space,
    applying said sound wave to the aural mechanism of such animals within such space, and
    increasing the sound intensity of said wave at said source to provide a decibel rating of from about 55 to 125 decibels at the point at which the wave is applied to the animals.

6. A method of repelling rodents and other undesirable small-cranium animals from a given space comprising the steps of:
    generating from a first single source a first non-sinusoidal ultrasonic sound wave comprising a fundamental frequency greather than 15 kilohertz and at least six major harmonic frequencies,
    generating from a second single source a second non-sinusoidal ultrasonic sound wave comprising a fundamental frequency and at least six major harmonic frequencies with said second sound wave having a fundamental frequency greater than and within 145% of the fundamental frequency of said first sound wave, directing said waves into and combining said waves within such given space, and
    applying said combined waves to the aural mechanisms of the animals.

7. A method of controlling infestation of small-cranium animals in a food storage area comprising the steps of:
    establishing and maintaining non-sinusoidal ultrasonic sound waves having an effective intensity on the sound sensing organs of the animals conforming to the following equation:

$$I = \sum_{W_1}^{W_x} \sum_{N=1}^{3} \sum_{K=1}^{3} (\sin Nwt)^K$$

Where
$I$ = Sound pressure or intensity as experienced by the sound responsive or sound sensing organ of the animal and transmitted to the brain of the animal $w = 2\pi \times$ frequency (where frequency is greater than 15 kilohertz)

$t =$ Time $x =$ The number of sources of sound waves having different fundamental frequencies $N =$ Number of harmonics which are multiples of the fundamental frequency which are included in each of said sound waves $K =$ Equation exponent directing said non-sinusoidal ultrasonic sound waves into such food storage area, and applying said non-sinusoidal ultrasonic sound waves to the aural mechanisms of such animals within such area.

References Cited by the Examiner

UNITED STATES PATENTS

| | | | |
|---|---|---|---|
| 170,274 | 11/1875 | King et al. | 116—137 |
| 992,487 | 5/1911 | Ellison | 116—137 |
| 1,826,129 | 10/1931 | Gronquist | 116—137 |
| 2,664,850 | 1/1954 | Smith | 116—137 |
| 2,971,491 | 2/1961 | Yeagley | 116—137 |
| 3,157,153 | 11/1964 | Moe | 116—137 |

FOREIGN PATENTS

152,103  4/1932  Switzerland.

OTHER REFERENCES

Newspaper Article in Times-Herald (Washington, D.C.) printed Nov. 30, 1947.

LOUIS J. CAPOZI, *Primary Examiner.*